United States Patent [19]
Hanna et al.

[11] Patent Number: 5,603,552
[45] Date of Patent: Feb. 18, 1997

[54] HIGH STRENGTH, HIGH TEMPERATURE AND HIGH STRAIN RATE APPLICATIONS OF A ZINC-BASE ALLOY

[75] Inventors: Michael D. Hanna, Royal Oak; Moinuddin S. Rashid, Bloomfield Hills, both of Mich.

[73] Assignee: General Motors Corporation, Detroit, Mich.

[21] Appl. No.: 356,015

[22] Filed: Dec. 14, 1994

[51] Int. Cl.⁶ ............................................. A47C 31/00
[52] U.S. Cl. ...................... 297/473; 297/344.1; 248/429
[58] Field of Search ................................. 297/473, 344.1, 297/311; 248/429, 420, 424

[56] References Cited

U.S. PATENT DOCUMENTS

| | | | |
|---|---|---|---|
| 4,990,310 | 2/1991 | Rashid et al. | 420/514 |
| 5,125,611 | 6/1992 | Cox | 297/473 X |
| 5,147,117 | 9/1992 | Quinn | 303/115.2 |
| 5,150,872 | 9/1992 | Isomura | 248/429 |
| 5,219,213 | 6/1993 | Matouka et al. | 303/115.2 |
| 5,273,242 | 12/1993 | Mouri et al. | 248/429 |
| 5,292,178 | 3/1994 | Loose et al. | 297/344.1 |

OTHER PUBLICATIONS

M. D. Hanna et al, "ACuZinc:Improved Zinc Alloys for Die Casting Applications", SAE Technical Paper Series #930788— Internation Congress and Exposition Mar. 1–5, 1993.

M. S. Rashid et al, "ACuZinc:Creep Resistant Zinc Die Casting Alloys", North American Die Casting Association, Cleveland T93–041.

M. D. Hanna et al, "The Influence of Composition and Microstructure on the Strength of Zinc Alloys", Advances in Science, Technology and Applications of Zn—Al Alloys, Edited by G. Torres Villasenor et al Mexico '94.

*Primary Examiner*—Laurie K. Cranmer
*Attorney, Agent, or Firm*—Cary W. Brooks

[57] ABSTRACT

The present invention includes high strength, high temperature and strain rate applications of a zinc-base alloy including about 83 to 94 weight percent zinc, about 4 to about 11 percent copper and about 2 to about 4 percent aluminum. The composition may also include minor components such as magnesium and impurities. The alloy is used to construct automotive components which are subject to an instantaneous load of between 40–500 MPa. The alloy is particularly suitable for constructing components which are subject to such loads under high temperatures. In fact, components constructed from the alloy become much stronger at higher temperatures under sudden stress.

4 Claims, 5 Drawing Sheets

HIGH STRENGTH, HIGH TEMPERATURE AND HIGH STRAIN RATE APPLICATIONS OF A ZINC-BASE ALLOY

FIELD OF THE INVENTION

The invention relates to high strength, high temperature and high strain rate applications of a zinc-copper-aluminum alloy, and more particularly to a vehicle seat having die castings of such alloy.

BACKGROUND OF THE INVENTION

In a typical die casting operation, molten metal is injected at high pressure into a fixed-volume cavity defined by reusable water-cooled metal dies. Within the cavity, the metal is molded into a desired configuration and solidified to form a product casting. The metal is injected into the cavity by a shot apparatus comprising a sleeve for receiving a charge of the molten metal and a plunger that advances within the sleeve to force the metal into the cavity. Two types of shot apparatus are known. A hot chamber apparatus comprises a shot sleeve immersed in a bath of a molten metal. In a cold chamber apparatus, the molten charge is transferred, for example by ladle, into the shot apparatus from a remote holding furnace.

Zinc-base alloys are commonly formed by die casting, in large part because of a conveniently low melting point. Heretofore, zinc die castings have exhibited a microstructure characterized by soft phases, such as the eta or alpha phases in zinc-aluminum alloys, that lack stability even at moderately high temperatures. As a result, such alloys have had poor high temperature creep resistance that has restricted their use, mainly to decorative parts.

Rashid et al., U.S. Pat. No. 4,990,310 discloses a creep-resistant zinc alloy including 4–11 percent copper, and 2–4 percent aluminum. The alloy includes a microstructure with an intimate combination of fine epsilon and eta phases that is particularly resistant to slip. As a result, the product die casting from the alloy exhibits improved strength, and wear resistance primarily due to the epsilon phase, but also a dramatically improved creep resistance, particularly in comparison to similar zinc die castings that are substantially epsilon-free.

Commercial zinc alloys (Zamak and ZA alloys) are used mainly for decorative applications. They are rarely used in functional/structural applications because their strength and/or creep properties do not meet requirements. Instead, stronger materials like steel are used to meet specifications. Steel parts are usually machined, whereas, zinc alloys can be die cast to shape.

Furthermore, many automotive and nonautomotive components are required to withstand high forces at high strain rates. At higher temperatures (up to 150° C.) the strain rate sensitivity becomes more important since low melting metals such as zinc alloys usually soften at this temperature. Thus, any increase in strength to offset this softening is an added value.

Some metals and alloys are strain rate sensitive at room temperatures, but, the magnitude of tensile strength increase is small or negligible. Stainless steel and different aluminum alloys have negligible strain rate sensitivity and the increase in tensile strength was minimal. The increase in strength is also very small with increasing strain rate in other types of aluminum alloys. No increase in tensile strength has been found in other nonferrous alloys such as copper and brass. Different hot rolled steels, increase less than 10% in tensile strength with increased strain rate for the same strain rate range used in our study ($10^{-5}$ to $10^0$ sec$^{-1}$). When iron and miled steel are tested at higher temperatures (up to 200° C.), the ultimate tensile strength does not increase with increasing strain rate, and they lose their strain rate sensitivity.

A variety of materials are available from which one may attempt to successfully fashion components from. Many automotive components are subject to very high loads, for example during an automobile crash. Many automotive components are subject to high temperatures such as those components under the hood or components which involve high temperature applications under dramatic loading. Conventional wisdom dictates that such components are constructed from relatively expensive, heavy alloys which often require machining.

The present invention overcomes many of the prior art shortcomings.

SUMMARY OF THE INVENTION

The present invention includes high strength, high temperature and strain rate applications of a zinc-base alloy including about 83 to about 94 weight percent zinc, about 4 to about 11 percent copper and about 2 to about 4 percent aluminum. The composition may also include minor components such as magnesium and impurities. The alloy is used to construct automotive components which are subject to an instantaneous force between 40–500 MPa. The alloy is particularly suitable for constructing components which are subject to such loads under high temperatures (higher than ambient temperature). In fact, components constructed from the alloy have greater relative strength at higher temperatures under sudden stress.

These and other objects, features and advantages will become apparent from the following brief description of the drawings, detailed description, and appended claims and drawings.

DETAILED DESCRIPTION

Rashid et al., U.S. Pat. No. 4,990,310, the disclosure of which is hereby incorporated by reference, describes a creep resistant die casting form from a zinc-base alloy including about 4 to about 12 percent copper and about 2 to about 4 percent aluminum. That zinc, copper and aluminum alloy is now known as ACuZinc™. It has recently been discovered that the strength of a zinc-base alloy containing 4 to about 12 weight percent copper and about 2 to about 4 percent aluminum, prepared by the die casting process disclosed in the '310 patent has increased strength when the strain rate is increased by dynamic and fast loading. The strength of the component formed from the ACuZinc™ alloy is increased about 50 percent at room temperature, about 68% at 50° C.; about 220% at 100° C.; about 2600% at 150° C. when the loading rate was increased from $10^{-5}$ to $10^0$ $sec^{-1}$. Thus, the zinc-based alloy can be used in applications unthinkable for other zinc-based alloys.

The ACuZinc™ alloys which exhibit such high strength under dramatic loading and temperature, include a duplex structure having a skin of fine grains of epsilon-phase (copper rich) ranging between 1–2 microns embedded in a matrix of η (zinc rich) and Alpha phase (aluminum rich). The inner portion of the component contains larger grain sizes of the epsilon phase.

Figure 1:
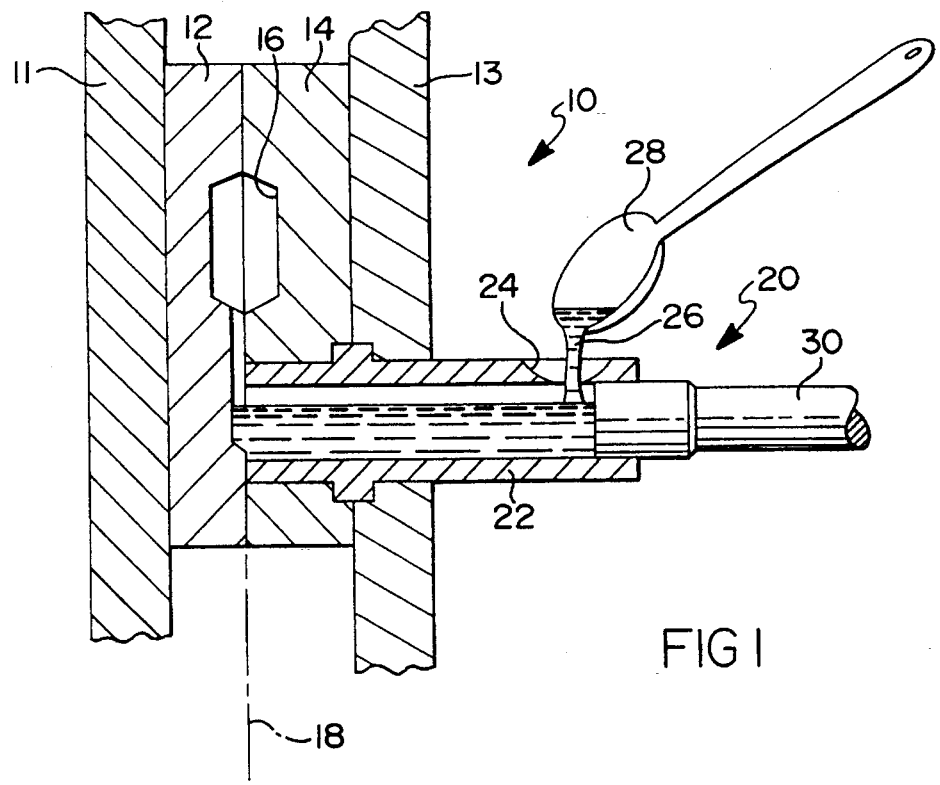
FIG. 1 is a cross sectional view of a cold chamber die casting machine for casting zinc-aluminum-copper alloy according to the present invention.
Figure 2:
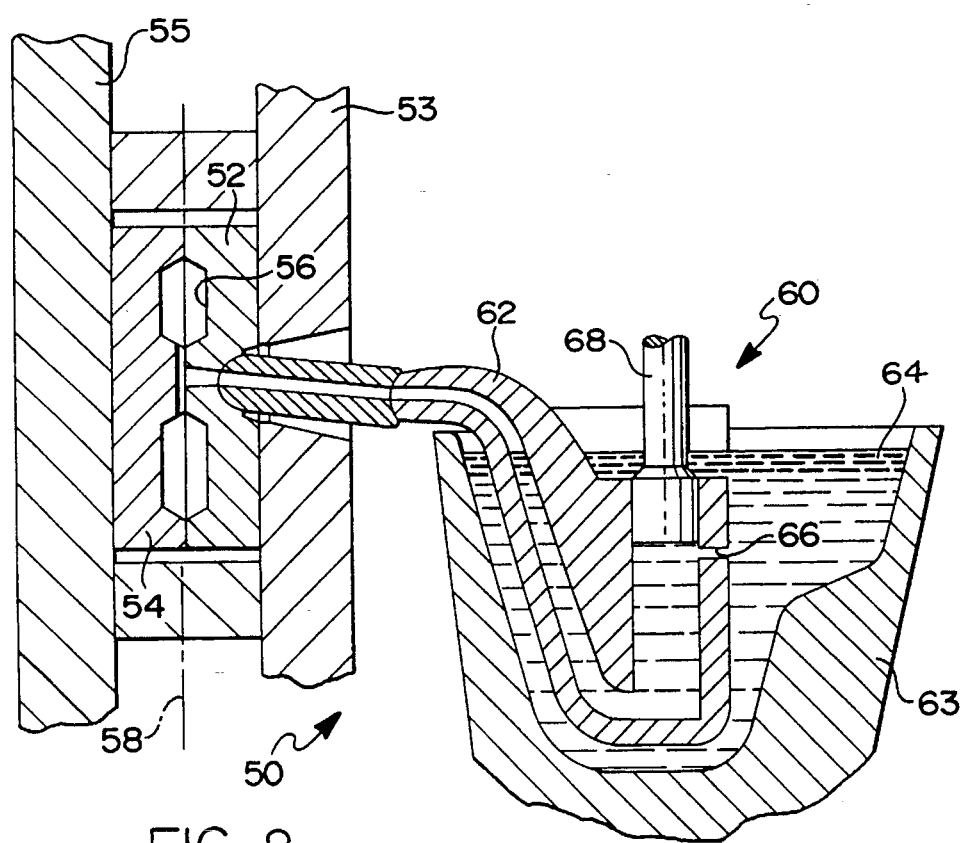
FIG. 2 is a cross sectional view of a hot chamber die casting machine for casting zinc-aluminum-copper alloy according to the present invention.

In a first example of this invention, and ACuZinc™ die casting is prepared as follows. A die casting was formed of a zinc-base, copper-aluminum alloy using a conventional cold chamber die casting machine shown schematically in FIG. 1. Machine 10 comprises a movable platen 11 and a stationary platen 13. Die halves 12 and 14 are mounted on platens 11 and 13, respectively, and cooled by water circulated through passages (not shown) therein. In the closed position shown in the figure, die halves 12 and 14 cooperate to define a fixed-volume die cavity 16 suitably sized and shaped for producing a casting of a desired configuration. At appropriate times during the casting cycle, platen 11 moves relative to platen 13 to part die halves 12 and 14 along a plane indicated by line 18 for ejection of a product casting. Machine 10 also includes a shot apparatus 20 comprising a generally cylindrical shot sleeve 22 that communicates with cavity 16. Sleeve 22 includes an inlet 24 for admitting a molten metal charge 26 poured, for example, from a suitable ladle 28. A hydraulically driven shot plunger 30 is slidably received in sleeve 22 and advances toward the die sections for forcing metal from sleeve 22 into cavity 16.

In accordance with a preferred embodiment of this invention, charge 26 was composed of an alloy comprising 10.0 weight percent copper, 3.6 weight percent aluminum, 0.03 weight percent magnesium and the balance zinc and impurities. The charge was poured at a temperature of about 532° C. into shot sleeve 22 through port 24. Slot plunger 30 was advanced to inject the charge into casting cavity 16. The cavity surface temperature was about 140° C. After filling the die cavity, the shot plunger continued to apply a load of 1340 kilograms for about 12 seconds. Within the die cavity, the metal cooled and solidified, whereafter the die sections were parted to eject a product casting.

Figure 4:
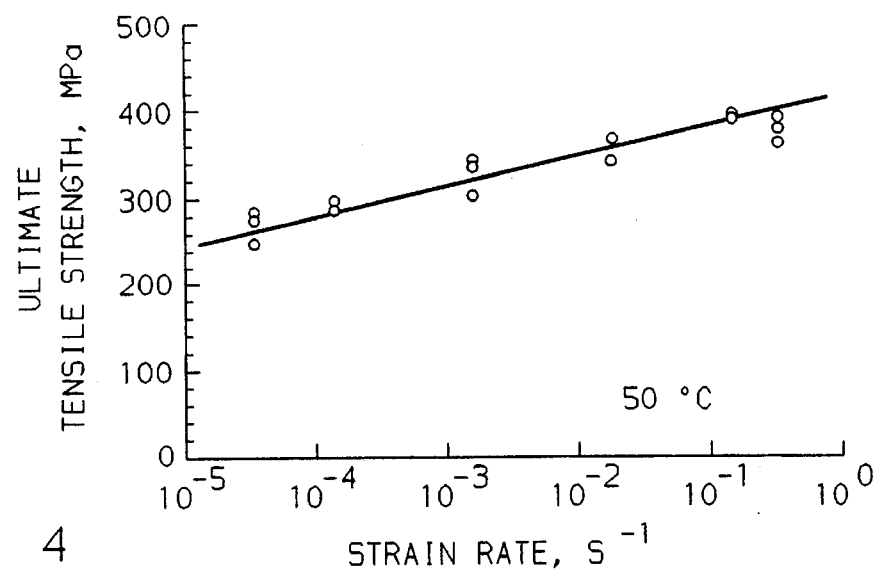
FIG. 4 is a graph of the ultimate tensile strength of an alloy, used to make components according to the present invention, tested at 50° C. with increasing strain rate.

In a second embodiment, zinc die castings of this invention were manufactured using a hot chamber die casting machine 50 shown schematically in FIG. 4. Machine 50 comprises water-cooled die halves 52 and 54 mounted on a stationary platen 53 and a movable platen 55, respectively, adapted for moving die halves between a closed position shown in FIG. 4 wherein the die halves cooperate to form a casting cavity 56 and an open position wherein the die halves are parted along a plane indicated by line 58 for ejection of a product casting. In accordance with common hot chamber die casting process, die casting machine 50 comprises a shot apparatus 60 formed of a goose neck sleeve 62 partially submerged in a molten metal bath 64 contained in melting pot 63. Shot apparatus 60 further comprises hydraulically driven plunger 68 slidably received in goose neck 62. When plunger 68 is in a retracted position shown in the figure, a charge of molten metal from bath 64 fills goose neck 62 through an inlet port 66. For casting, plunger 68 is driven downwardly to force molten metal through sleeve 62 into die cavity 56.

In accordance with this invention, a hot chamber die casting was formed of an alloy containing 5.0 weight percent copper, 3.0 weight percent aluminum, 0.035 weight percent magnesium and the balance substantially zinc. The temperature of the charge was about 490° C. The casting cavity surface temperature was about 150° C. During injection, the melt was subjected to a pressing load of 62 kiloPascals. Other materials with 3.5–12.0 weight copper, 1–8 weight Al and 0.01–0.06 Mg of composition will have similar effect of strain rate on loading at the above tested composition.

Chemical composition of the test specimens used in this investigation was as described above. Specimens tested were 25.4 mm long×5.33 mm diameter in the gauge section, and were used in the as-diecast condition, with the as-cast surface intact. Tests were performed using an Instron universal testing machine which has the capability of maintaining constant cross-head speed. Load-elongation data were recorded automatically during the tests. The specimens were loaded to failure and ultimate tensile strength calculated. Tests were conducted at four different temperatures (room temperature, 50° C., 100° C., and 150° C.) using a temperature controlled chamber to insure constant temperature during the test. Crosshead speeds used were 0.02, 0.2, 2, 20, 200 and 500 mm/min, which provided strain rates ranging from $1.3 \times 10^{31}$ $^5$ to $3.2 \times 10^{-1}$ $sec^{-1}$.

Figure 3:
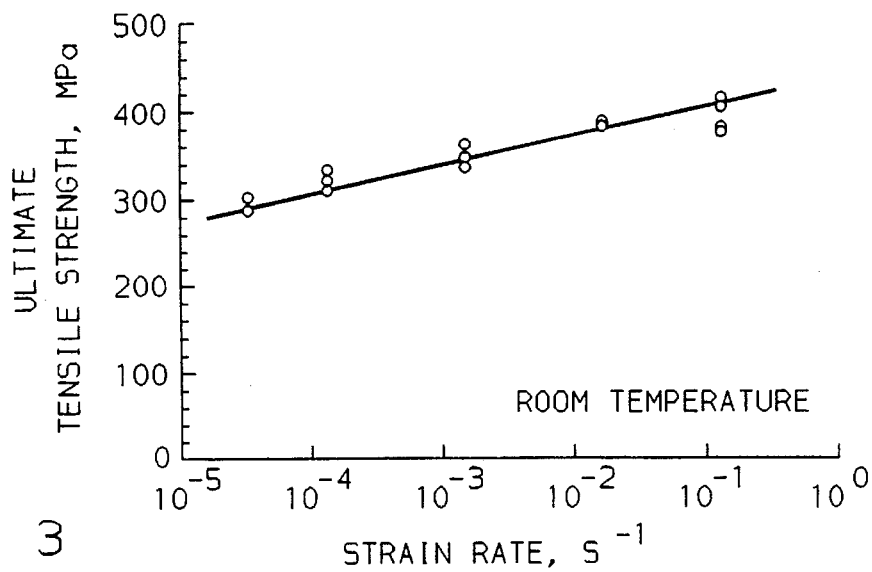
FIG. 3 is a graph of the ultimate tensile strength of an alloy used to make components according to the present invention, tested at room temperature with increasing strain rate.

FIG. 3 shows the variation of ultimate tensile strength (UTS) of this alloy at room temperature (20° C.) with increasing strain rate. It was found that when the strain rate is increased from $10^{-5}$ to $10^0$ $sec^{-1}$, the UTS increased from 280 to 440 MPa (57%).

Figure 7:
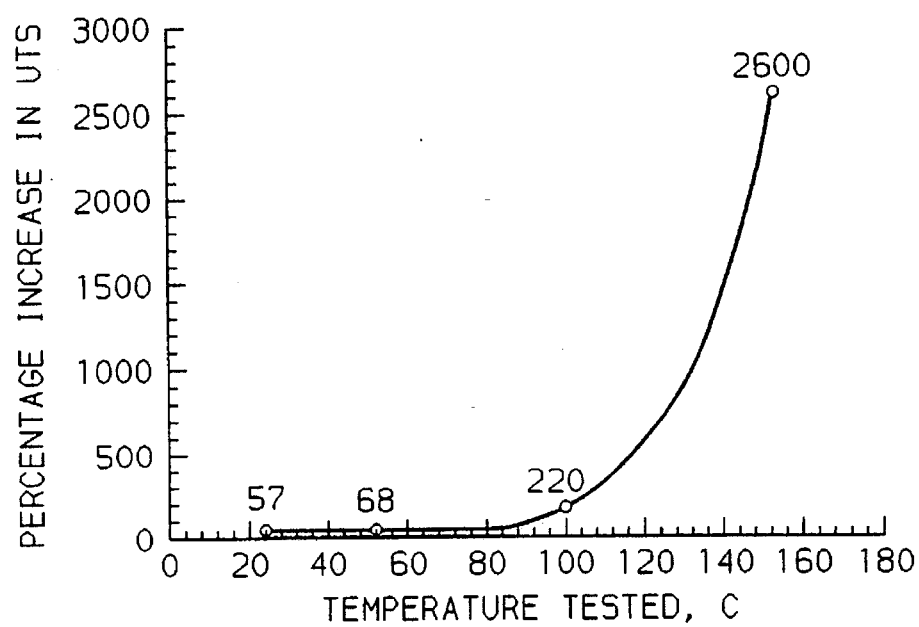
FIG. 7 is a graph of the percentage increase in ultimate tensile strength of the alloy with increasing temperature.
Figure 8:
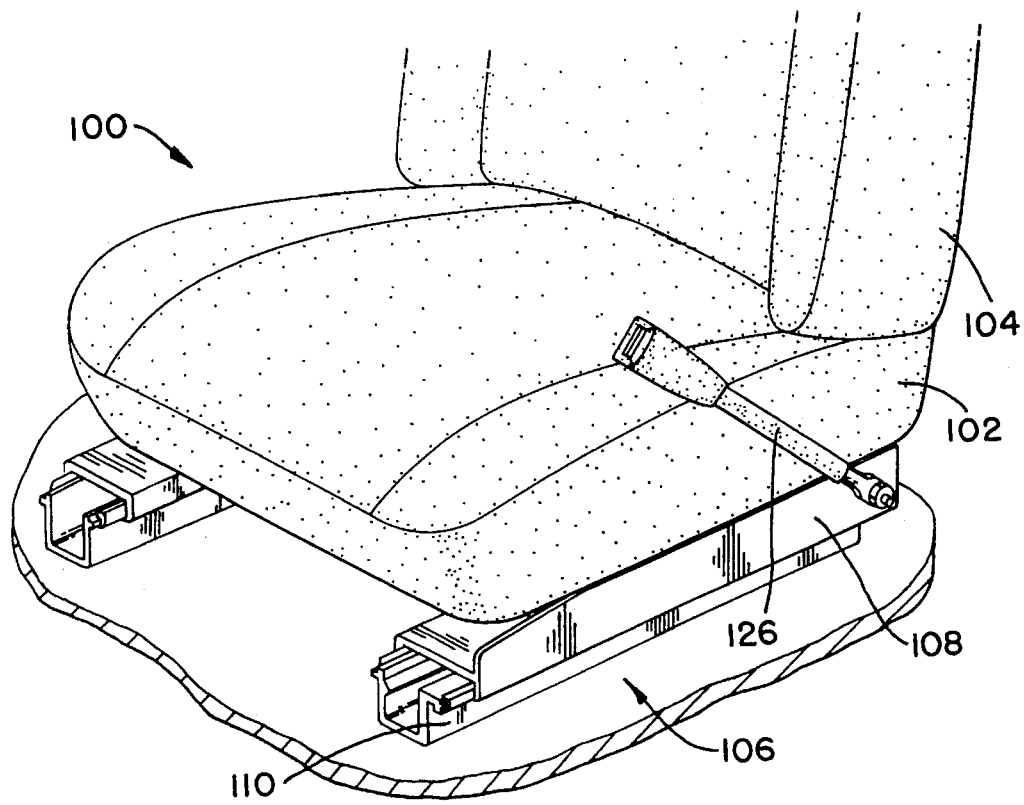
FIG. 8 is an illustration of an adjustable vehicle seat with a seat belt secured to a seat adjustment mechanism according to the present invention.
Figure 9:
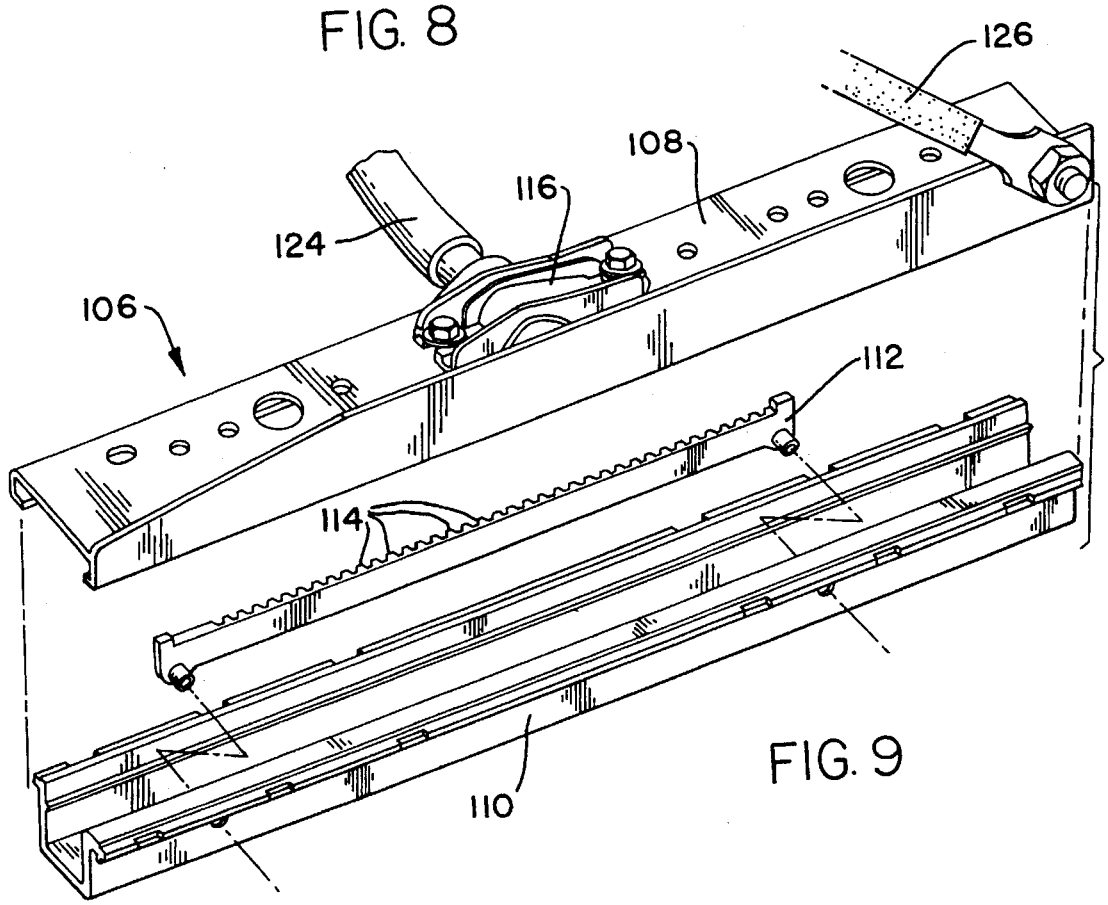
FIG. 9 is an enlarged, exploded view of the seat adjustment mechanism of FIG. 8.
Figure 10:
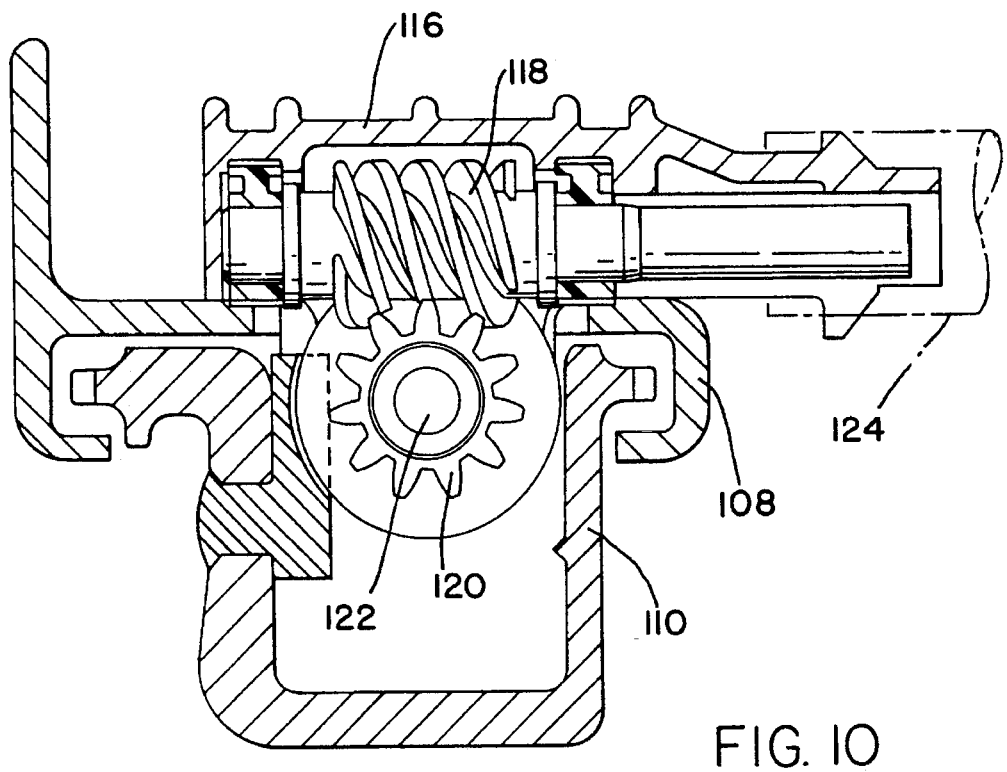
FIG. 10 is an enlarged, end view of the seat adjustment mechanism of FIG. 9 showing a housing with a worm and helix screw.
Figure 11:
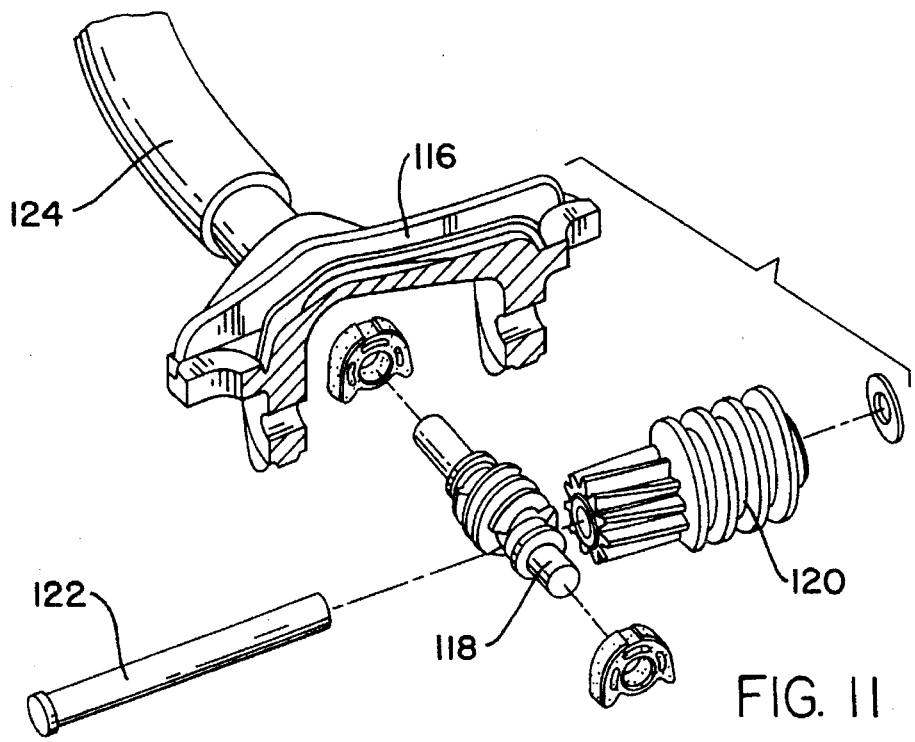
FIG. 11 is an exploded view of the housing, worm and helix screw of FIG. 10.

The percentage increase in ultimate tensile strength with increasing strain rate was found to be much higher when the specimens were tested at higher temperatures. At 50° C. the UTS increased from 250 to 420 MPa (68%) for the same increase in strain rate (FIG. 4). The percentage increase was 220% at 100° C. (FIG. 5), and 2600% at 150° C. (FIG. 7).

Figure 5:
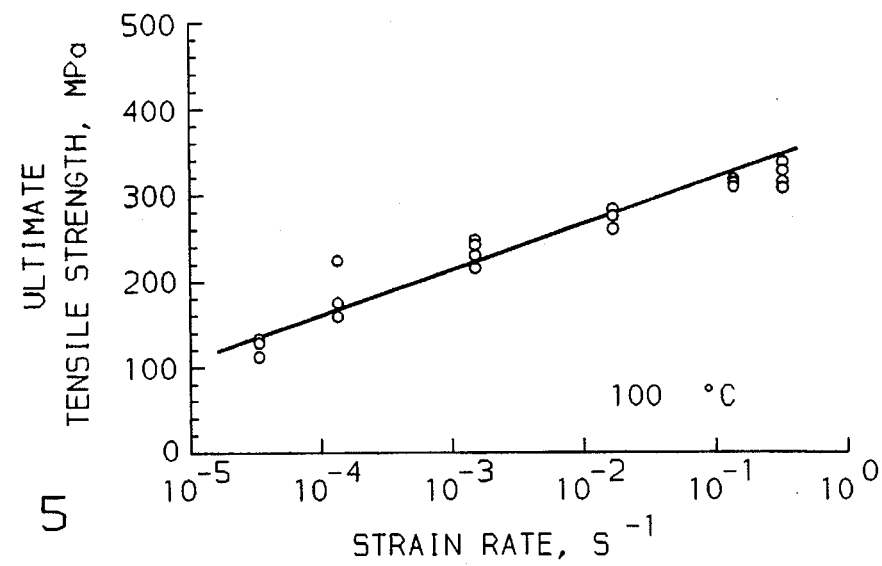
FIG. 5 is a graph of the ultimate tensile strength of an alloy, used to make components according to the present invention, tested at 100° C. with increasing strain rate.
Figure 6:
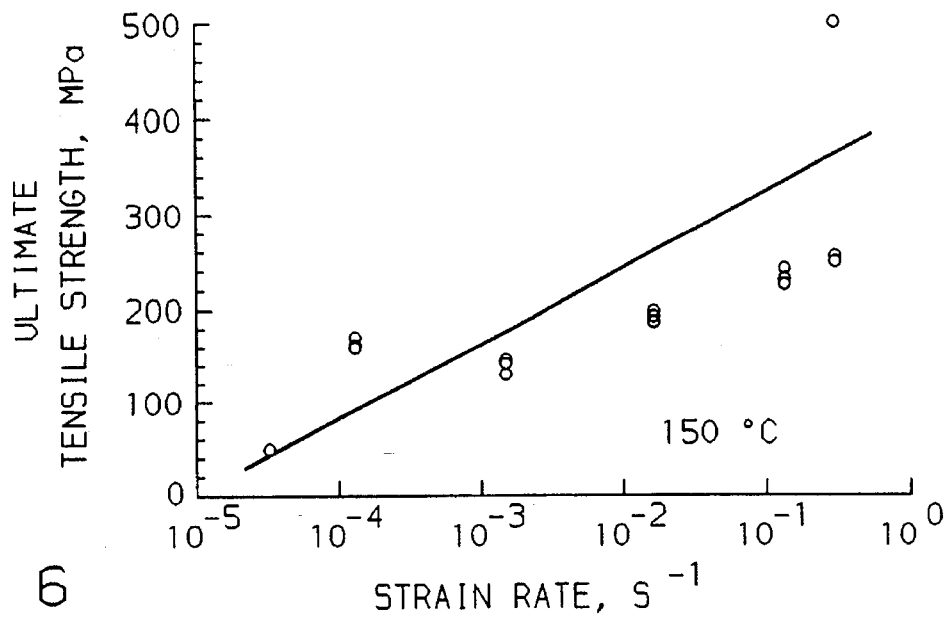
FIG. 6 is a graph of the ultimate tensile strength of an alloy, used to make components according to the present invention, tested at 150° C. with increasing strain rate.

The above data is replotted in FIG. 5 to show the percentage increase in UTS with temperature when the strain rate increases from $10^{-5}$ to $10^0$ $sec^{-1}$. It is clearly shown that the strain rate sensitivity increases dramatically above 80° C.

A typical microstructure of the alloy has a duplex structure consisting of an outer skin of fine grains of ε-phase (copper rich) ranging between 1–2 microns embedded in a matrix of η (zinc rich) and α phases (aluminum rich). The microstructure is much coarser inside the specimen.

In this investigation, we discovered that ACuZinc™ alloys will strengthen when the strain rate increases between $10^{-5}$ to $10^{0}$ sec$^{-1}$, and this increase is greater at higher temperatures. This behavior is unexpected and has not been reported before. Alloys such as aluminum, copper, stainless steel are not strain rate sensitive when tested at room temperature. The strain rate sensitivity of pure iron and steel alloys is much smaller than that found in ACuZinc™ alloys at room temperature. Iron and steels lose their strain rate sensitivity when tested at higher temperatures (reported up to 200° C.).

With this discovery ACuZinc™ die cast alloys can be used with confidence at higher temperatures for components in fast loading/high temperature applications. The unexpected increase in strength with strain rate during high temperature testing provides increased potential use of these parts in many applications such as for under-hood automotive applications use, such parts as connectors, brackets, support, and engine mounts, which can be subjected to a combination of high strain rates and high temperature conditions as during an impact in a collision. It may also be applicable in other systems such as the air bag system and components and attachments used to secure the seat belt assembly. Seat actuators, and components in the steering columns, gears, racks, supports, and housing are other potential components, where increase strength at high rate deformation is important.

Data:

In Table 1 the Ultimate Tensile Strength of the alloy tested is compared to commercial zinc base alloys (Zamak 3 and ZA 8 alloys) tested at two different temperatures and strain rate of $1.312 \times 10^{-3}$ sec$^{-1}$. The results show that the ultimate tensile strength at 50° C. for ACuZinc™ was the same as that measured at room temperature (20° C.). 351 MPa at 50° C. (100° F.) compared to 347 MPa at room temperature. However, the Ultimate Tensile Strength of commercial Zamak 3 alloy was 253 MPa at 20° C. but 227 MPa when is tested at 50° C.; for ZA 8 alloy it was 336 MPa at 20° C. vs. 283 MPa when tested at 50° C.

TABLE 1

| Temperature | Alloy Tested UTS, MPa | Zamak 3 UTS, MPa | ZA 8 UTS, MPa |
| --- | --- | --- | --- |
| 20° C. | 347 | 253 | 336 |
| 50° C. | 351 | 227 | 283 |

Components constructed from the ACuZinc™ alloy provide resistance to deformability and damage when the components are under mechanical loadings at high strain rates or when they are impacted as in a crash or collision situation. Even though ACuZinc™ is a zinc-base alloy, it has surprisingly been discovered that high load bearing components manufactured from ACuZinc™, that is, components subjected to loadings between 40–500 MPa, exhibited a dramatic improvement in strength. Examples of high load components include seat belt assembly components, actuators, gears, seat actuators, seat racks, racks, motor mounts, electronic housings, and other components which must remain functional during an automotive collision.

Nonautomotive components, subject to dramatic load increases and at high temperatures may be made from the ACuZinc™ alloy. For example, components for hand tools such as drills, may be constructed from ACuZinc™ alloys. Such materials are often subject to high loads and temperatures. For example when a saw or drill having ACuZinc™ components hits a nail or other material, the ACuZinc™ components actually become stronger under such high loadings and temperatures.

Many of the components in an automobile, such as those under the hood in the engine compartment, are subject to high temperatures up to 150° C. In an automobile collision, it is important for these components remain functional so that the automobile can continue to operate or can be driven away from the scene of an accident. Accordingly, components such as hose couplings, battery connectors and extensions, engine brackets and mounts may be constructed from ACuZinc™. Particularly important are housings for electronic components, such as the automotive computer module housing which may be constructed out of ACuZinc™. Upon impact in a collision, an ACuZinc™ electronic housing is much more likely to survive the impact than other materials. If the computer module is damaged, the car will not be driveable.

In one preferred embodiment, the invention includes an adjustable seat 100 for a motor vehicle (FIGS. 8–11). The seat includes a bottom rest 102 and a pivotally connected backrest 104. The bottom rest 104 is connected to a seat adjustment mechanism 106, that includes an upper slidable member 108 such as a channel. The upper slidable member 108 slides along a stationary lower member channel 110. A rack 112 is attached to the lower channel 110. The rack has a plurality of engagement surfaces 114 such as teeth or notches or holes formed therein. A housing 116 is secured to the upper slidable member 108. The housing 116 carries a worm 118 and a helix screw 120. The worm is rod shaped and has a spiral thread on its outer surface. The helix screw has a rod-shaped portion with a spiral thread on its outer surface and a gear portion having a plurality of teeth extending outwardly in a direction perpendicular to the longitudinal axis of the rod-shaped portion of the helix screw. The helix screw 120 is secured to the housing 116 by a pin 122. The worm 118 and helix screw 120 are operably connected for engagement with the engagement surfaces 114 of the rack 112. The seat includes an electric motor and associated cables 124 connected to the worm 118 for turning the helix screw 120 which is engaged in the rack 112. Activation of the motor causes the seat to be moved forward and backward along the rack 112. When the motor is not activated, the worm and helix screw 120 lock the seat in position along the rack 112. In manual seat adjustment systems, the seat can be locked in position by a paw which engages the engagement surfaces 114 of the rack 112. A safety belt 126 is secured to the upper slidable member 108. Attaching the safety belt to the upper slidable member 108 keeps the length of the safety belt around the passenger constant even though the seat is being moved forward and backward. This avoids the problems associated with attaching the safety belt to the frame of the vehicle as was done in prior constructions.

According to the present invention, the rack 112 is made from the zinc-copper-aluminum ACuZinc™ alloy as described herein. Surprisingly, the low cost zinc-based alloy could be substituted for the traditional steel materials used to construct the rack in the past. In the seat configuration described above, it is important that the rack not fail during a crash because the safety belt is attached to the upper movable channel and not to the vehicle frame. In a vehicle crash, a force of about 2000–3600 lbs./80 milliseconds on the rack 112, worm 118, helix screw 120 and housing 116. It was surprising to find that the zinc-based alloy of the present invention was a suitable substitute for steel and was able to withstand high strain conditions associated with vehicle crashes. The worm 118, helix screw 120 and housing 116 can also be constructed from the zinc-copper-aluminum alloy according to the present invention each of which is subject to high stress rates in vehicle crashes.

The embodiments of the invention in which an exclusive property or privilege is claimed are defined as follows:

1. An adjustable vehicle seat comprising:

a seat comprising a bottom rest and a pivotally connected backrest;

A seat adjustment mechanism including an upper slidable member, a stationary lower member, a rack secured to the lower member and wherein said rack has engagement surfaces;

said seat being connected to the upper slidable member;

said seat adjustment mechanism further comprising a lock for engaging the engagement surfaces of the rack and locking the seat in a stationary position with respect to the stationary lower member;

a seat belt secured to the upper slidable member and not to a frame of the vehicle and so that the seat belt moves with the seat when the seat is moved;

and wherein the rack comprises a die casting of an alloy consisting essentially of, by weight, between 4 and 12 percent copper, 2 and 4 percent aluminum and the balance zinc and impurities, and having fine epsilon and eta grains dispersed in a ternary eutectic material.

2. An adjustable vehicle seat as set forth in claim 1 wherein said lock comprises a worm and helix screw for engaging the engagement surfaces of the rack.

3. An adjustable vehicle seat as set forth in claim 2 wherein said worm and helix screw comprise die castings of said alloy.

4. An adjustable vehicle seat as set forth in claim 3 further comprising a housing covering said worm and helix screw, and wherein said housing comprises a die casting of said alloy.

* * * * *